(12) United States Patent
Dancasius et al.

(10) Patent No.: US 6,592,141 B1
(45) Date of Patent: Jul. 15, 2003

(54) AIRBAG MODULE FOR MOTOR VEHICLES

(75) Inventors: Michael Dancasius, Wuppertal (DE); Detlev Wilhelm Guthke, Hagen (DE); Richard Standinger, Schechingen (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/465,596

(22) Filed: Dec. 17, 1999

(30) Foreign Application Priority Data

Dec. 18, 1998 (DE) .......................................... 198 58 691

(51) Int. Cl.$^7$ .............................................. B60R 21/16
(52) U.S. Cl. ................................ 280/728.2; 280/728.1; 280/742; 280/731
(58) Field of Search .......................... 280/728.1, 728.2, 280/728.3, 731, 736, 742

(56) References Cited

U.S. PATENT DOCUMENTS

| | | | | |
|---|---|---|---|---|
| 5,024,464 A | * | 6/1991 | Kawaguchi et al. | 280/731 |
| 5,410,114 A | * | 4/1995 | Furuie et al. | 200/61.55 |
| 5,452,914 A | * | 9/1995 | Hirai | 280/743.1 |
| 5,508,482 A | * | 4/1996 | Martin et al. | 200/61.55 |
| 5,624,130 A | * | 4/1997 | Ricks | 24/453 |
| 5,772,241 A | * | 6/1998 | Heilig | 280/731 |
| 5,775,725 A | * | 7/1998 | Hodac et al. | 280/728.2 |
| 5,826,901 A | * | 10/1998 | Adomeit | 280/728.2 |
| 5,829,780 A | * | 11/1998 | Tesauro et al. | 280/731 |
| 5,931,492 A | * | 8/1999 | Mueller et al. | 200/61.55 |
| 6,095,549 A | * | 8/2000 | Adomeit et al. | 280/728.2 |
| 6,129,374 A | * | 10/2000 | Yamada et al. | 280/728.2 |
| 6,164,689 A | * | 12/2000 | Rivin et al. | 280/731 |
| 2002/0096865 A1 | * | 7/2002 | Ford | 280/731 |

FOREIGN PATENT DOCUMENTS

| | | |
|---|---|---|
| DE | 3710173 A1 | 10/1988 |
| DE | 29805207 U | 6/1998 |
| DE | 29805210 U1 | 6/1998 |
| DE | 29816923 U | 11/1998 |
| DE | 29902033 U | 4/1999 |
| EP | 0822123 A1 | 7/1997 |
| WO | WO 97/46424 | 12/1997 |

\* cited by examiner

*Primary Examiner*—Lesley D. Morris
*Assistant Examiner*—Paul Royal, Jr.
(74) *Attorney, Agent, or Firm*—Kathryn A. Marra

(57) ABSTRACT

The invention relates to an airbag module for motor vehicles comprising a housing for an inflatable airbag and a gas generator, with the gas generator and the housing being movable independently of one another for reduction and isolation of vibration and for ease of horn actuation.

16 Claims, 3 Drawing Sheets

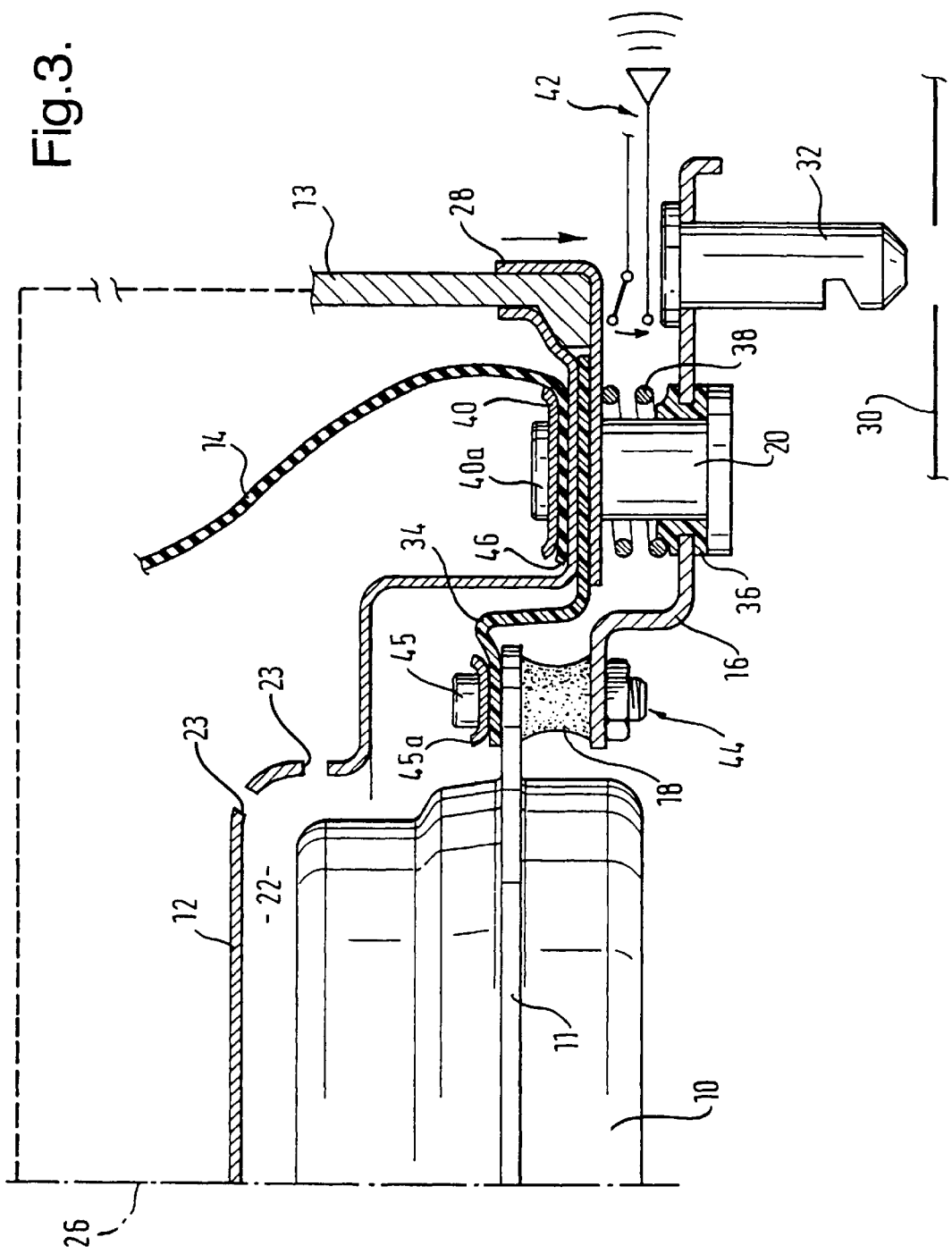

AIRBAG MODULE FOR MOTOR VEHICLES

TECHNICAL FIELD

The invention relates to an airbag module for motor vehicles with a housing for an inflatable airbag and a gas generator.

BACKGROUND OF THE INVENTION

Airbag modules of this kind serve to receive the airbag in the folded state and to inflate it by means of the gas generator in the event of an accident. The airbag modules are installed as a unit in the motor vehicle. For drivers' side airbags, which are to be accommodated in the central region of the steering wheel, it is often desirable to have the functioning both of the airbag system as well as of the horn system of the vehicle arranged in the central region of the steering wheel. Furthermore, the air bag module is typically subject to vibrations that arise during the operation of the vehicle. Thus, it is desirable to provide an airbag module that is integrated into the vehicle in such a manner that further tasks are accomplished in addition to the protective function. Additional functions must not be affected by vibrations of the vehicle and steering column.

SUMMARY OF THE INVENTION

The object on which the invention is based is to create an airbag module that is simply constructed, that is not impaired by vehicle vibrations, and that can be used in particular as a driver's airbag that can be integrated into a steering wheel unit.

This object is satisfied in accordance with the invention by the gas generator and the housing being movable independently of one another.

In accordance with the invention, the housing and the gas generator do not form a unit being rigidly connected to one another. This decoupling of the gas generator and the housing from one another enables the airbag module in accordance with the invention to be mounted in the motor vehicle in such a manner that vibrations arising can be specifically kept away from a certain component of the airbag module, for example from the housing. Furthermore, the total mass of the airbag module is divided up into the housing and the airbag on the one hand and into the gas generator on the other hand by the invention. The respective masses and the respective kind of coupling to the steering wheel system can be specifically tuned through the invention to additional functions which are to be assigned to the housing and/or the gas generator when installed.

In accordance with a preferred embodiment of the invention the gas generator is connected to a base element which can be secured to a steering wheel unit.

Through this the gas generator can be connected to the steering wheel unit, whereas the housing is movable relative to the steering wheel unit. The housing can be provided as the part of the horn system which is to be moved for actuating the vehicle horn, with the weight of the housing being considerably reduced as a result of the separation of the gas generator from the housing in accordance with the invention. A resilient seating of the housing at the base element, which is possibly provided, and which must be designed to be comparatively stiff in order to avoid an unintentional actuation of the vehicle horn through vibrations which are transmitted to the housing, can be designed in such a manner that the application of only a comparatively small force is required for actuating the vehicle horn. The reduced mass of the part of the airbag module to be moved thus permits the required actuation force to be reduced without at the same time increasing the possibility of unintentional actuations of the vehicle horn.

The airbag module in accordance with the invention is thus particularly well suited for use as a constituent of a combined airbag and horn system.

In accordance with a further preferred exemplary embodiment of the invention, the gas generator serves as a vibration damper.

Vibrations that, during operation of the vehicle, are transmitted for example to the steering wheel unit can be damped by the mass of the gas generator through a suitable design of the connection between the gas generator and the steering wheel unit, which is designed for the transmission of typically arising vibrations. The mass of the gas generator, which is large in comparison with the total mass of the airbag module, is thus used as a damping mass. A transmission of the vibrations to the housing of the airbag module is thereby avoided in accordance with the invention. An additional function which is possibly assigned to the housing, for example, the design as part of the actuation unit of a vehicle horn, is thus not impaired through vibrations which arise during the operation of the vehicle. This in turn simplifies the design of a seating of the housing on the steering wheel unit.

In accordance with a further preferred embodiment of the invention, at least one wall of the housing is designed as a gas inlet, with the gas generator being surrounded at least region-wise by the housing wall, which is designed as a gas inlet.

Through this a compact overall arrangement can be achieved.

In accordance with a further preferred exemplary embodiment of the invention, the gas generator, a wall of the housing which is designed as a gas inlet and at least one sealing element bound a gas inlet space.

The provision of a gas inlet space of this kind enables an optimal flowing of the gas into the housing, and thus into the airbag to be ensured, in spite of the decoupling of the gas generator from the housing.

Further preferred embodiments of the invention are set forth in the appended claims, in the description, and in the drawings.

BRIEF DESCRIPTION OF THE DRAWINGS

The present invention will now be described, by way of example, with reference to the accompanying drawings, in which:

FIG. 3 shows yet another alternate embodiment of an airbag module in accordance with the invention in a sectioned side view.

DESCRIPTION OF THE PREFERRED EMBODIMENT

Figure 1:
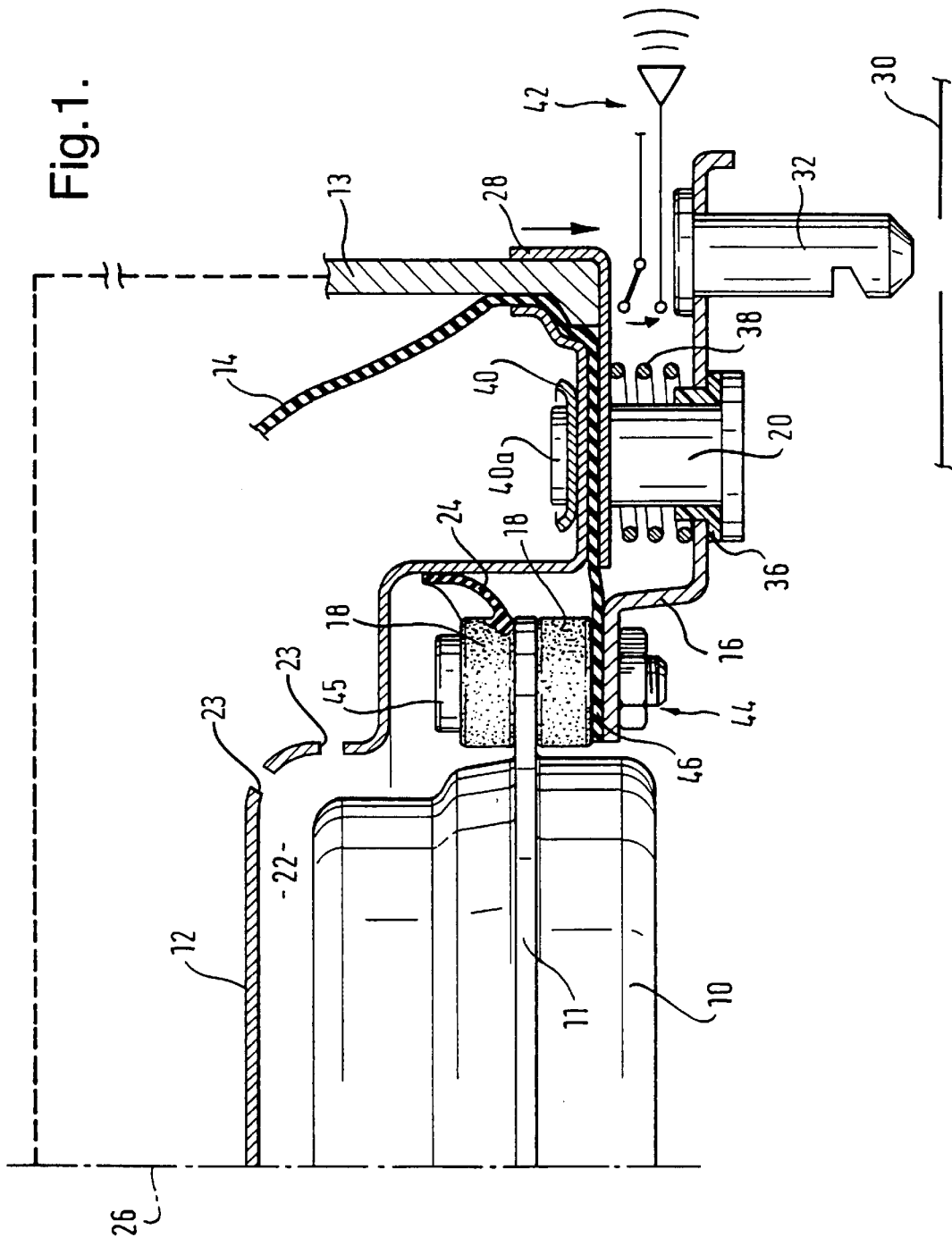
FIG. 1 shows an embodiment of an airbag module in accordance with the invention in a sectioned side view.
Figure 2:
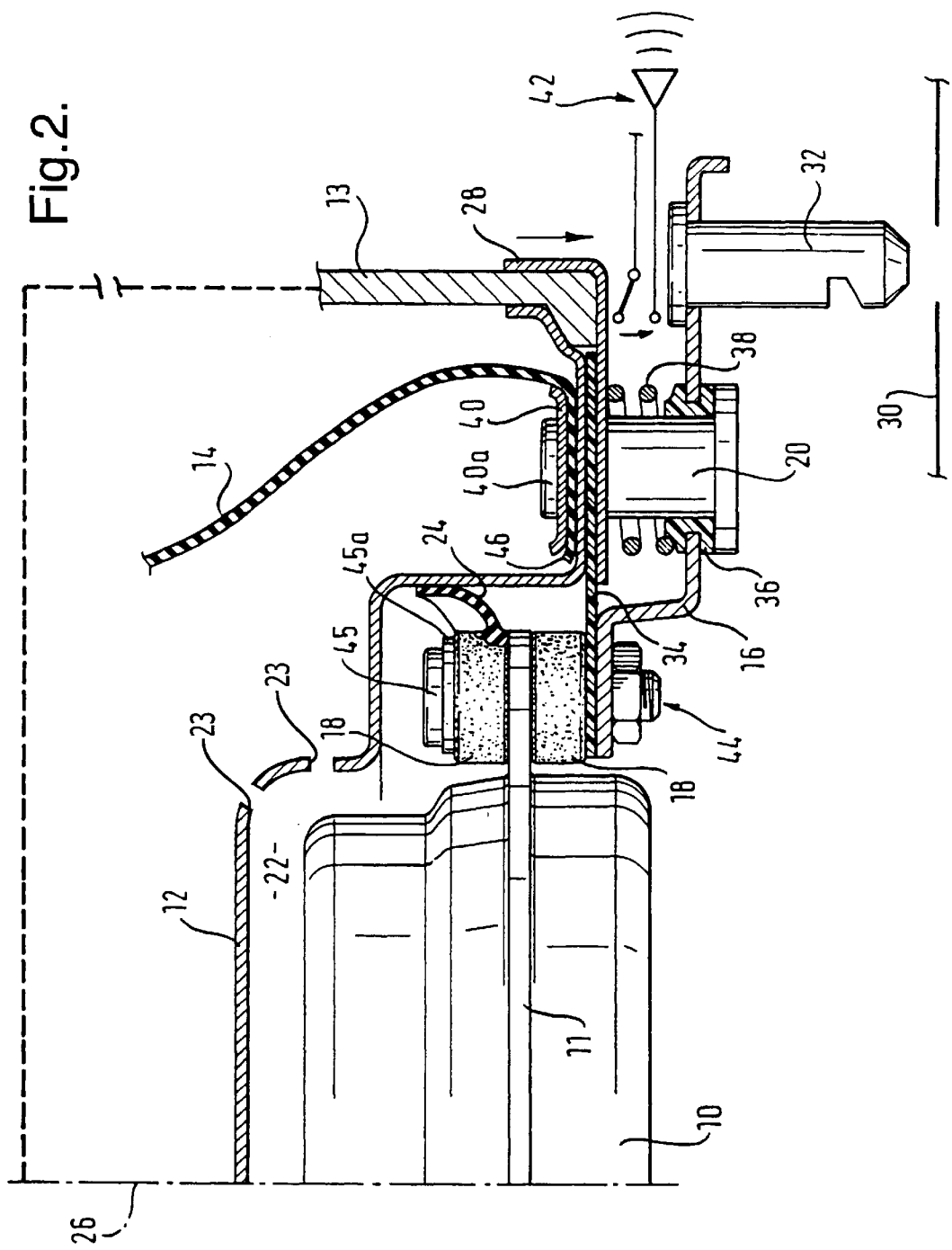
FIG. 2 shows an alternate embodiment of an airbag module in accordance with the invention in a sectioned side view.

In FIGS. 1 to 3, the part shown in each case situated on one side of a central axis 26, of a substantially rotationally symmetrical airbag module in accordance with the invention is illustrated.

In accordance with FIG. 1, the airbag module comprises a housing for a folded airbag 14 having a bowl-like base plate 12 and a cap-like cover 13 locked to the base plate 12. A holder ring 28 serves to secure the cover 13 to the base plate 12. Furthermore, a ring-shaped base element 16 is provided which can be latched with a merely schematically indicated steering wheel unit 30 of a vehicle via latching pins 32 which are distributedly arranged along the outer edge region of the base element 16.

Radially inside the latching pins 32, the base element 16 has bores which are distributedly provided in the peripheral direction and into which sliding bearings 36, in which guide pins 20 are axially guided, are fitted in. The sliding bearings 36 also serve as electrical insulation between the base element 16 and the base plate 12. A securing element 40, the base plate 12, the airbag 14 and the holder ring 28 are connected to one another, e.g. screwed together, in each case by means of threaded pins 40a and the guide pins 20. Coil springs 38 are arranged between the holder ring 28 and the base element 16, the coil springs 38 being pushed onto the guide pins 20 and pressing the base element 16 and the holder ring 28 apart. The guide pin 20 preferably has a collar which determines the bias tension of the coil spring 38 and the distance between the base element 16 and the holder ring 28. In this way the airbag module is movable relative to the base element 16 and thus relative to the steering wheel unit 30 of the vehicle.

In the embodiment of FIG. 1, the coil springs 38 are not supported directly by the base plate 12, but rather by the holder ring 28 being provided with apertures for the guide pins 20.

The above described arrangement for seating the base plate 12 on the base element 16 is also designated as elastic floating system or floating bearing, in which the base plate 12 and thus the entire housing unit of the airbag module, in a way, lies loosely in contact on the coil springs 38. The base plate 12 and thus the housing component of the airbag module in accordance with the invention comprising the base plate 12, the cover 13, the holder ring 28 and the airbag 14 is therefore not rigidly connected to the base element 16 but is rather elastically resiliently seated by means of the floating system, with it being possible for the housing component to be moved towards the base element 16 against the restoring force of the coil springs 38.

The housing component being movable downwardly in FIG. 1, can be used to actuate a vehicle horn 42, as is schematically indicated in FIG. 1. When mounted to the steering wheel unit 30, the movable housing component of the airbag module in accordance with the invention consequently serves as an actuation element of the vehicle horn 42, with it being possible to design the front side of the cover 13 as that region of the steering wheel which is acted upon by the driver for the actuation of the vehicle horn 42.

The gas generator 10 is connected to the inner edge region of the base element 16 via two ring-shaped elastic coupling elements 18, which for example consist of rubber. For this the gas generator 10 is provided with a circumferential holder lug 11 which is arranged between the two coupling elements 18. At clamping positions distributedly arranged in the peripheral direction, the coupling elements 18 are in each case pressed together by means of a screw connection 44 in such a manner that the holder lug 11 is elastically clamped over its entire periphery between the two ring-shaped coupling elements 18. In this way the gas generator 10 is suspended at the base element 16. Instead of ring-shaped coupling elements 18, a plurality of separate coupling pieces or intermediate pieces distributedly arranged about the central axis 26 can also be provided.

In principle it is also possible to secure the gas generator 10 rigidly to the base element 16 without the provision of the coupling elements 18 or of other elastic intermediate pieces. The coupling elements or intermediate elements can also be executed in an vibration damping manner. The different possibilities for the coupling between the gas generator 10 and the base element 16 will be discussed again elsewhere.

The dimensions of the airbag module in accordance with the invention are chosen such that the lower side of the gas generator 10 lies approximately at the same height as the ring-shaped base element 16.

For the sealing of the space between the base plate 12 and the gas generator 10 a circumferential sealing lip 24 is provided which is formed at the upper ring-shaped coupling element 18 and which lies sealingly in contact at a wall section of the base plate 12 extending approximately parallel to the central axis 26. The sealing lip 24 can, however, also be attached separately.

Furthermore, the airbag 14 is led out of the housing between the cover 13 and an upwardly bent outer edge region of the base plate 12 for sealing the intermediate space between the housing component and the gas generator 10. Outside the housing the airbag 14 extends substantially perpendicular to the central axis 26 between the base plate 12 and the holder ring 28 up to the side wall of the gas generator 10. The edge region 46 of the airbag 14 bounds the open end of the airbag 14, which is also known as the mouthpiece of the airbag, is clamped between the base element 16 and the lower ring-shaped coupling element 18. In this way the elastic floating system for supporting the housing component, comprising the guide pins 20 and the coil springs 38, is sealed by the airbag 14 with respect to the intermediate space between the base plate 12 and the gas generator 10.

It is also possible to use either only the sealing lip 24 or only the airbag 14 for sealing purposes. If the sealing merely takes place through the airbag 14, the edge region 46 thereof can also be clamped between the upper ring-shaped coupling element 18 and a screw head 45. Alternatively, it is possible to connect the edge region 46 of the airbag 14 directly to the holder lug 11 and thus to the gas generator 10 in order to achieve the desired sealing.

As a result, a gas inlet space 22 is bounded by a sealing lip 24 or, respectively, the airbag 14, the base plate 12 and the gas generator 10, into which the gas which is expelled by the gas generator can flow in the event of an accident after triggering of the gas generator 10 without escaping into the surroundings. The base plate 12 is provided with gas inlet openings 23, the number, design and arrangement of which being chosen such that the desired amount of gas per unit time flows into the housing in the desired manner distributed over the base plate 12 with the respective required flow velocity, in order to inflate the folded airbag 14. The base plate 12 of the airbag module in accordance with the invention thus serves as a diffuser.

Through the provision of the ring-shaped coupling elements 18, gas cannot escape between the gas generator 10 and the radial inner edge of the base element 16. As an alternative to the embodiment of FIG. 1, a plurality of in each case two-piece coupling elements can be provided for clamping the holder lug 11 of the gas generator 10, which are in each case arranged in the region of the screw connections 44. In order to provide for the required gas density in this case as well, the base element 16 can, in the region between the floating system, i.e. the guide pins 20, and the radial inner edge, be provided with a circumferential sealing element for example in the form of an O-ring, which is pressed sealingly against the steering wheel unit 30 when being mounted in the vehicle. A space of the steering wheel unit 30 existing beneath the gas generator 10 and being sealed by means of the O-ring with respect to the surroundings, is in this case flow-technically connected to the gas inlet space 22. A further alternative design possibility consists in providing a closed plate-like base element without a central opening for the gas generator 10 instead of the ring-shaped base element 16, in order to seal the region beneath the gas generator 10.

Vibrations or oscillations of the base element 16 arising during the operation of the vehicle are transmitted via the coupling elements 18, which clamp the holder lug 11, to the gas generator 10 with damping; i.e. energy is dissipated into the coupling elements 18. Due to the comparatively large mass of the gas generator 10, the driver does not sense the vibrations via the steering wheel.

As a result of the decoupling of the gas generator 10 from the housing component, the absorption of the vibration or vibration energy takes place without influencing other components of the airbag module. In particular, vibrations are not transmitted by the coil springs 38 but rather are kept away from the housing unit which substantially comprises the base plate 12, the holder ring 28 and the cover 13, so that comparatively soft coil springs 38 having a relatively small spring constant may be used. As a result, the force which must be applied by the driver for actuating the vehicle horn through pressing down the housing unit is relatively small, and there is further reduced potential that vibrations arising during operation of the vehicle will set the housing unit in motion and will lead to unintentional actuations of the vehicle horn 42.

The sealing lip 24, which is provided for the sealing of the gas inlet space 22 and which lies in contact at the base plate 12 of the housing, is designed in such a manner that the decoupling of the housing and the gas generator 10 is not impaired and the function of the gas generator 10 as an vibration damper is not disturbed. The design of the coupling elements 18, in particular the material and the shape thereof, is chosen in dependence on the respective circumstances and in particular on the parameters which determine the vibrations which arise, such as energy level, frequency etc.

Essential advantages of the airbag module in accordance with the invention thus consist in that the mass of the component which is to be acted upon by the driver for actuating the horn system is reduced, in that vibrations of the steering wheel are avoided through the use of the gas generator 10 as an vibration damping mass, in that the possibility of unintentional actuations of the vehicle horn as a result of vibrations is reduced, and in that a damping mass which is provided in addition to the airbag module can preferably be dispensed with.

In the embodiment of FIG. 1, securing the base element 16 to the steering wheel unit 30 takes place through the latching pins 32. It is, however, alternatively also possible to provide the base element 16 as an integral constituent of the steering wheel unit 30 of the vehicle and thus to fix the gas generator 10 directly to the steering wheel unit 30 for example via attaching elements corresponding to the screw connections 44.

The embodiments of the airbag module in accordance with the invention described in the following differ from the embodiment of FIG. 1 substantially through the kind of sealing the gas inlet space 22 which is bounded by the base plate 12 and the gas generator 10, but agree with the embodiment of FIG. 1 however with respect to the functioning principle and the advantageous effects.

In accordance with FIG. 2, the airbag 14 is not led out of the housing, but rather is clamped with its edge region 46 bounding the mouthpiece of the airbag between the securing elements 40 which are connected to the guide pins 20, and the base plate 12.

In the embodiment of FIG. 2, a separate sealing element 34 is provided which is formed in the shape of a ring and which is clamped with its radially outer edge region between the holder ring 28 and the base plate 12 and with its radially inner edge region between the lower ring-shaped coupling element 18 and the base element 16. The sealing lip 24 which is formed onto the upper ring-shaped coupling element 18 can in principle in this embodiment be dispensed with, too.

The radially inner edge region of the sealing element 34 can also be secured at another location, and indeed for example between the screw head 45 or a washer 45a, respectively, and the upper ring-shaped coupling element 18. The sealing element 34 can also be directly connected to the gas generator 10, for example to its holder lug 11.

In the embodiment of FIG. 3, an again separate sealing element 34 is provided for sealing the gas inlet space 22 and is clamped with its radially outer edge region between the holder ring 28 and the base plate 12 and with its radially inner edge region between the holder lug 11 of the gas generator and a washer 45a of the screw connection 44.

In contrast to the above described embodiments, the coupling of the gas generator 10 to the base element 16 takes place in accordance with FIG. 3 through a one-piece ring-shaped elastic coupling element 18 fastened between the holder lug 11 and the base element 16 by means of the screw connection 44.

In the above described embodiments, the coupling between the gas generator 10 and the base element 16 takes place in each case through one or more elastic coupling elements 18.

In principle, however, a rigid coupling of the gas generator 10 to the steering wheel unit 30 or to the base element 16, respectively, could also be provided. The coil springs 38 could also be designed weaker in this variant than would be possible without the independent movability of the housing 12, 13 and the gas generator 10 in accordance with the invention. The invention thus opens up the possibility of a more sensitive horns since the comparatively large mass of the gas generator 10 need not be moved along when actuating the horn 42 via the housing 12, 13.

A further possibility would be to provide a purely elastic coupling of the gas generator 10 to the base element 16 or the steering wheel unit 30, respectively. The vibrations of the gas generator 10 would in this case take place without damping, which at certain frequencies can lead to the gas generator vibrating too strongly and to the remaining steering wheel unit not oscillating. Nevertheless this variant, too, has in principle the above mentioned advantages of the invention.

Particularly preferred is an elastic coupling of the gas generator 10 to the base element 16 or to the steering wheel unit 30, respectively, via one or more vibration damping coupling elements so that vibration energy is dissipated into the coupling elements, e.g. through friction. An elastic coupling with a slight damping is preferably chosen which is designed in such a manner that resonance phenomena are avoided or vibrations of the steering wheel unit 30 or steering column, respectively, and of the gas generator 10 mutually cancel one another. The concrete embodiment of the coupling elements and thus the manner and the degree of its ability of absorbing vibrations is chosen in dependence on the respective requirements. The coupling elements can, for example, be manufactured from rubber or also a textile material or from a compound material.

What is claimed is:

1. An airbag module for motor vehicles comprising:
   an inflatable airbag;
   a housing for the inflatable airbag;
   a gas generator; and
   a base element securable to the motor vehicle, wherein the base element is operatively connected to the gas generator by at least one vibration damping coupling element and wherein the housing and the gas generator are moveable relative to one another substantially independently of one another.

2. The airbag module of claim 1, wherein the gas generator serves as a vibration damper.

3. The airbag module of claim 1, wherein the housing is moveable towards the base element against a restoring force.

4. The airbag module of claim 1, wherein the housing is supported on and resiliently seated on the base element.

5. The airbag module of claim 1, wherein the module further comprises at least one guide pin connected to the base element, and wherein the housing is displaceable along said at least one guide pin.

6. The airbag module of claim 1 wherein the module is operatively connected to a horn.

7. The airbag module of claim 6 wherein moving the housing relative to the base element actuates the horn.

8. The airbag module of claim 1 wherein at least one wall of the housing provides a gas inlet for the module.

9. The airbag module of claim 1, wherein the gas generator is at least partially surrounded by a housing wall that serves as a gas inlet.

10. The airbag module in accordance with claim 9 wherein the gas inlet serves as a gas diffuser.

11. The airbag module of claim 1, wherein the gas generator, a wall of the housing comprising a gas inlet and at least one sealing element bound a gas inlet space.

12. The airbag module of claim 1, wherein the gas generator includes at least one seal for sealing a gas inlet space.

13. The airbag module of claim 1 wherein the airbag includes a mouth opening and the housing includes a gas inlet space, the airbag extending out of the housing and being connected at an edge region bordering the mouth opening to one of the gas generator or the base element for sealing the gas inlet space.

14. The airbag module of claim 1, wherein the module includes a gas inlet space and wherein a separate sealing element is arranged between the gas generator and the housing.

15. The airbag module of claim 1 wherein the base element comprises subassembly of a steering wheel unit.

16. The airbag module of claim 1, wherein the module includes a gas inlet space and wherein a separate sealing element is arranged between the gas generator and the base element.

* * * * *